Aug. 22, 1933.  H. E. PETRILLI  1,923,744
INTERNAL COMBUSTION ENGINE
Filed Oct. 16, 1928   6 Sheets-Sheet 1

Inventor
Harry E. Petrilli.
By James C. Hamilton.
Attorney

Aug. 22, 1933.   H. E. PETRILLI   1,923,744
INTERNAL COMBUSTION ENGINE
Filed Oct. 16, 1928   6 Sheets-Sheet 6

Inventor
Harry E. Petrilli.
By James C. Hamilton,
Attorney

Patented Aug. 22, 1933

1,923,744

UNITED STATES PATENT OFFICE 1,923,744

INTERNAL COMBUSTION ENGINE

Harry E. Petrilli, Boston, Mass., assignor to Mercury Motor Corporation, Boston, Mass., a Corporation of Massachusetts Application October 16, 1928. Serial No. 312,805

1 Claim. (Cl. 123—11)

My present invention relates to internal combustion engines, and more particularly to an internal combustion engine of the rotary type, in which the driving force is imparted to the central drive shaft of the motor by the rotating cylinders which are directly connected to said drive shaft.

In my present invention I have devised an internal combustion engine on an entirely new principle of operation, which principle of operation is, as far as I am aware, new in certain details which are in the nature of improvements over the broad idea covered in an earlier application of mine. With my construction, I am enabled to remove the most serious defect in existing types of internal combustion engines, and the cylinders and pistons occupy such a relation to the driving shaft that the highest percentage of efficiency is obtained from a predetermined consumption of fuel; an engine which is comparatively of slow-speed and great power resulting in more dependability and longer life. This construction is such that the power is always delivered to the driving shaft in a direction that is practically tangent to such drive shaft and at no time is any power delivered to the crank or driving shaft that is radial thereto.

In carrying out my invention, I have arranged both the cylinders and the pistons to move in a circular path about the center of the drive shaft and provide means for obtaining relative motion between such pistons and cylinders, and as the cylinders are connected to the drive shaft through proper means, it is obvious that the power is always delivered to the said drive shaft tangent thereto. Further I have arranged means for bringing the pistons to rest during the firing operation without retarding in any way the movement of the cylinders which are driven ahead when the explosion of gas occurs thereby imparting power to the drive shaft because of their relation thereto. By using my design, I am able in this instance to obtain a rotation of approximately one hundred and nineteen degrees during the exhaust period, a rotation of approximately fifty eight degrees during the gas intake period, and a rotation of approximately eighteen degrees during the firing operation. It is obvious that under such circumstances, I have eliminated and reduced to a minimum back pressure in the exhaust operation which is a serious disadvantage in the older types of gas engines; I have facilitated the intake of gas not possible in the earlier types and developed an internal combustion engine of high compression and long firing stroke heretofore never obtained in a low-speed rotary engine. Further, I have provided means by which it is possible to construct an efficient air-cooled engine of the rotary type in which both the cylinders and pistons travel in a circular path in air for the major portion of their revolution about the drive shaft.

In the present model of my engine, I have shown in the accompanying drawings, an eight cylindered engine comprising two cylinder blocks in which is located the cylinders and pistons, four complete cylinder and piston units in each block but located on the common drive shaft at forty-five degrees to each other with respect to their firing position. By such an arrangement and design, I have obtained an engine in which eight firing operations occur in every single revolution of the drive shaft, and in each firing operation, power is delivered at a constant tangent to said drive shaft through the entire working stroke, therefore, I have developed a slow speed rotary engine of great power and unique design in which the mechanical efficiency is developed to a high degree.

The principle object therefore, is an improved internal combustion engine;

Another object of my invention is an improved internal combustion engine in which the cylinders drive the main drive shaft at a tangent, and in a rotary manner;

A further object of the present invention is an improved internal combustion engine with a long exhaust and gas intake stroke;

Other objects and novel features of the construction and arrangement of parts comprising my engine will appear as the description of the invention progresses.

In the accompanying drawings illustrating a preferred embodiment of my invention, Fig. 1 is a side elevation;

Figure 4:
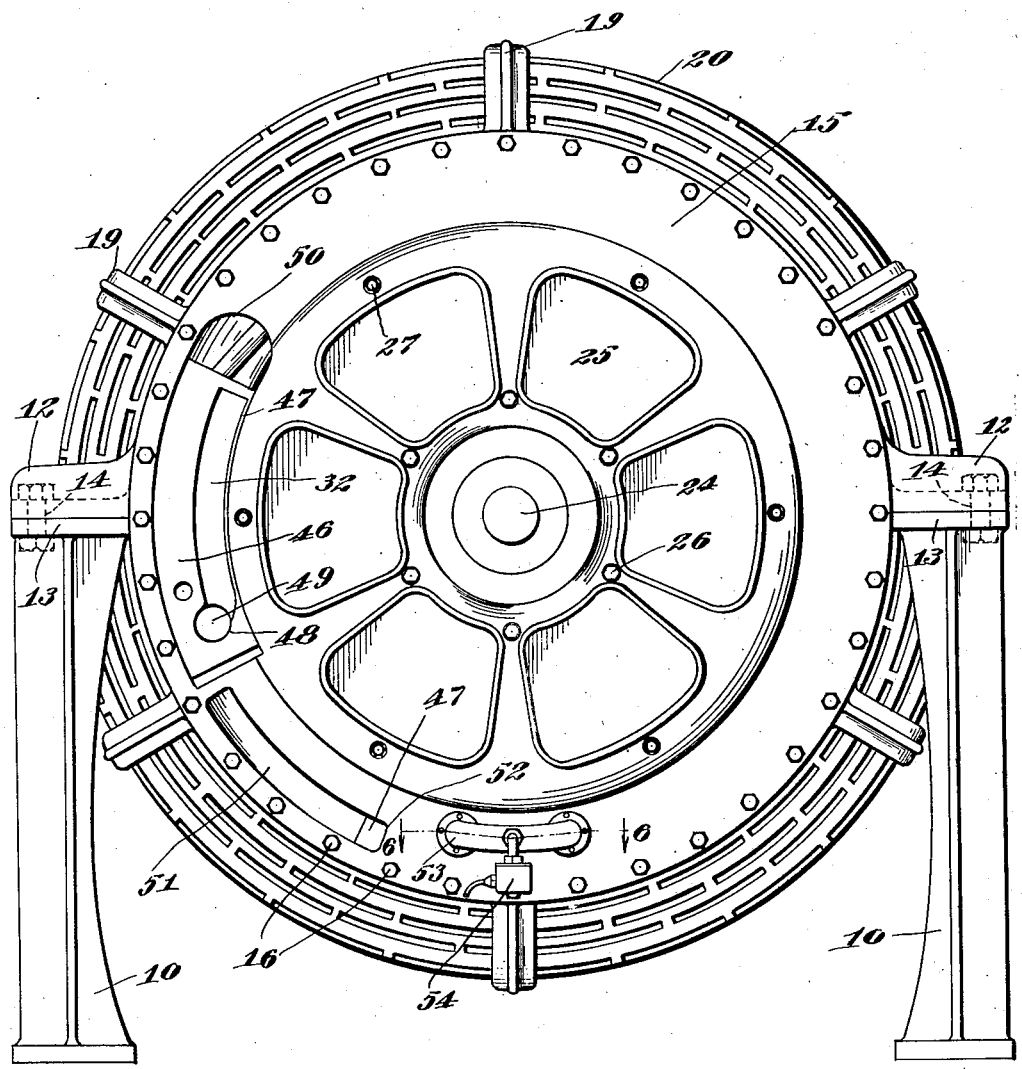
Fig. 4 is an end elevation.

Referring to the drawings, 10 designates a pair of upright supporting members on which is mounted the cylinder casing member 11 which is provided at either side with outstanding lug members 12 adapted to rest on the flat top flanged head 13 of the said upright supporting members 10, and held securely thereto by means of bolts 14. As the complete engine shown in the drawings is composed of two similar units for the sake of having a thoroughly balanced engine as well as a powerful one, each of such units will not be described in detail as the description of one will apply equally with respect to the other. Therefore, the casing members 11 are substantially circular in appearance in end view, as will be observed from an inspection of Figs. 2, 4, and 5, and are further provided with end cover plates 15 which are securely attached to such casings 11 by means of bolts 16 located at pretermined intervals about the periphery of said end plates 15. Such casing members 11 define a substantially circular chamber 17 in which are located the cylinder and piston members more fully described later. Around the outer periphery of chamber 17 is provided an annular passage way 18 in which special spark-plugs travel, the operation of which will be described in detail in another place on the present specification. To make possible such a construction, the inner and outer sides of the periphery of the casings 11 are connected together by means of bridge members 19 located at intervals about such periphery and are connected together by a screen member 20 adapted to fit snugly against the inside surfaces of the bridges 19. For purposes of removal these screens 20 are provided in sections thus making it possible to remove either or all of them whenever it may become necessary to remove or adjust the spark-plugs. The two casing unit members 11 are connected together adjacent their inner sides by a central wall member 21 adapted to receive at its center two ball bearing members 22 separated from each other by means of a spacer washer or collar 23, and journalled within said bearing members 22 is the main drive shaft 24. On the inner side of each engine unit is another side wall unit 25 secured to the end plates by two series of bolts 26, and 27, and at the center of such wall members 25 are also located ball bearing members 28, and retainer collars 29, said bearing members 28 providing for further bearing and thrust points for said drive shaft 24 therein located.

Figure 1:
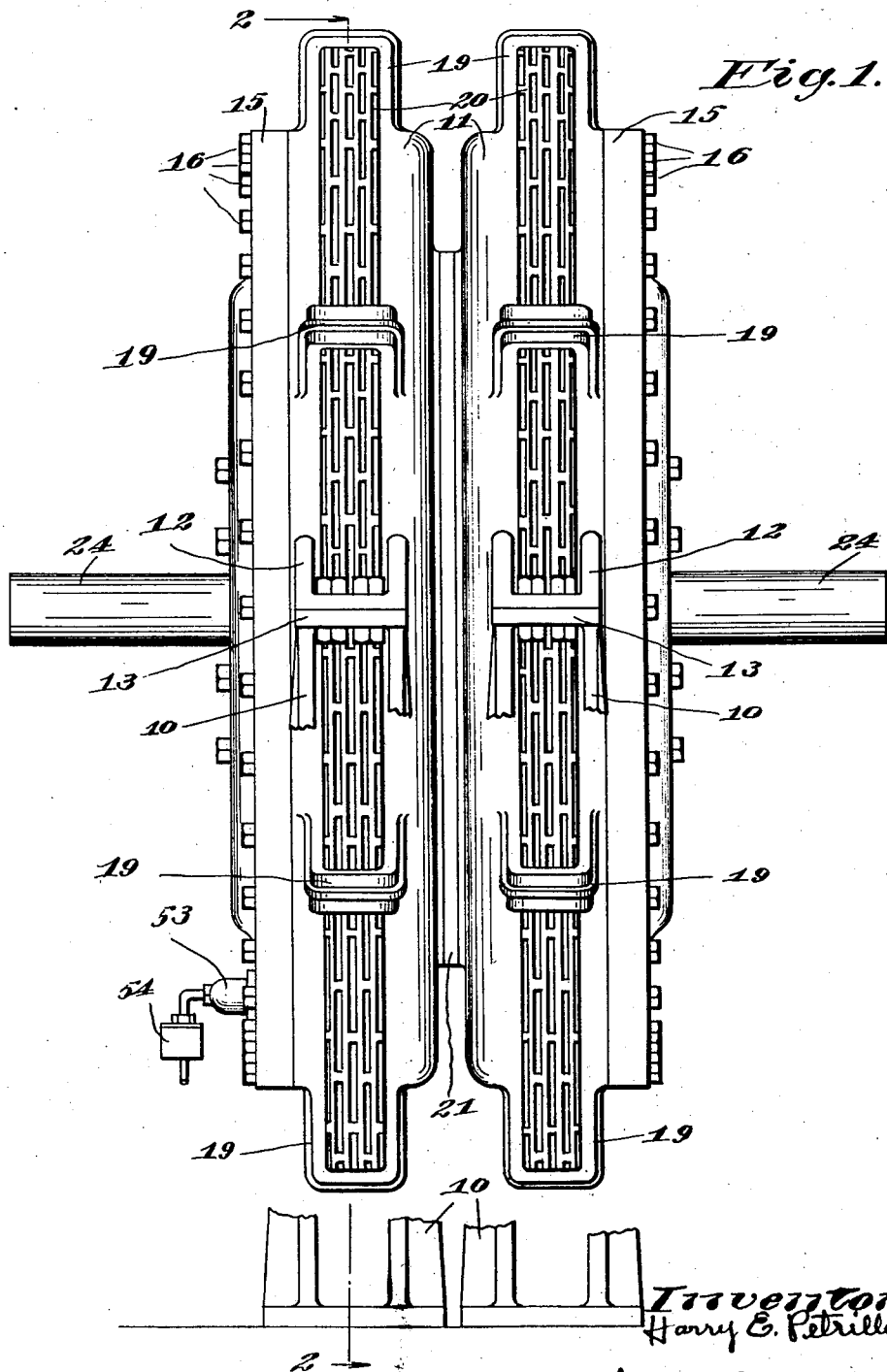
Figure 2:
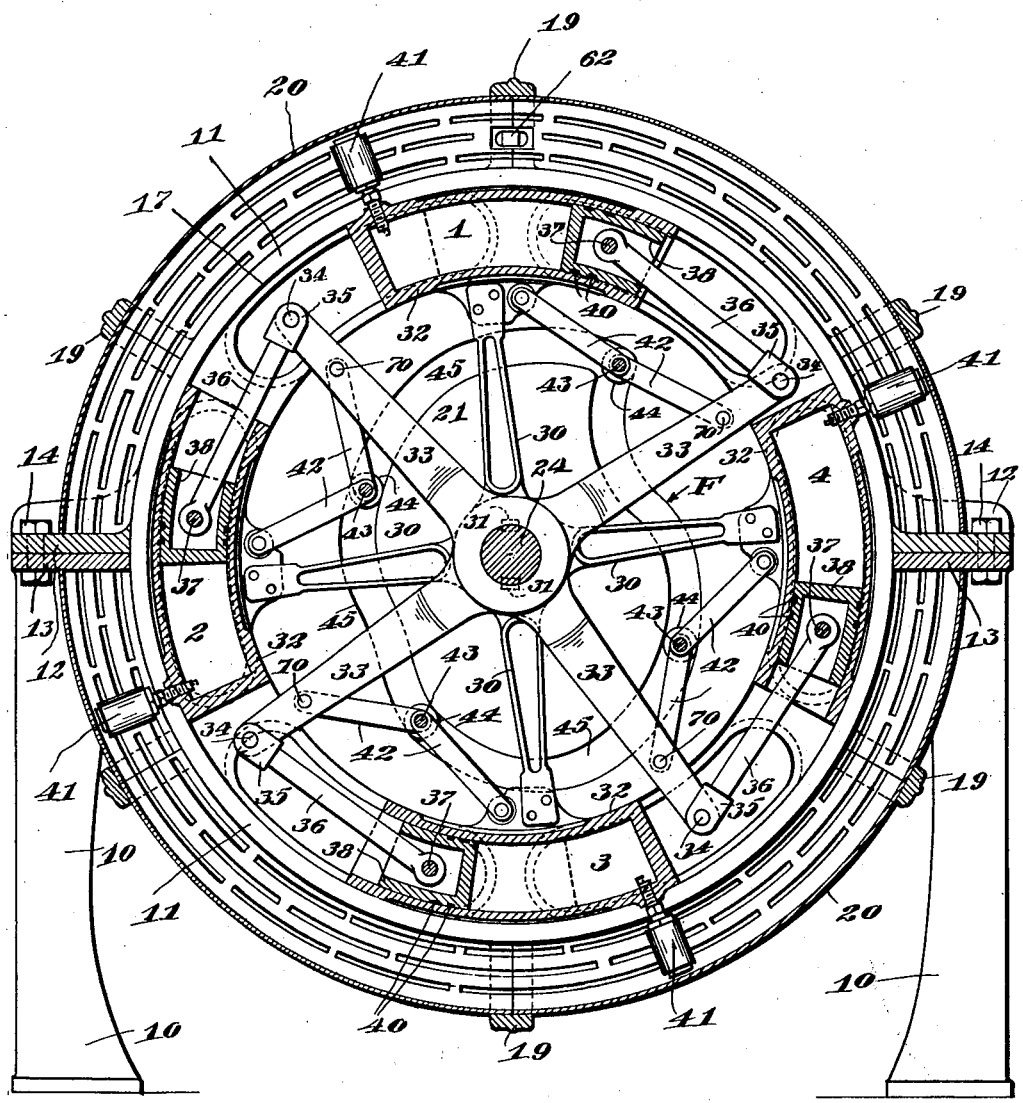
Fig. 2 is a central sectional elevation taken on the line 2—2 of Fig. 1.
Figure 3:
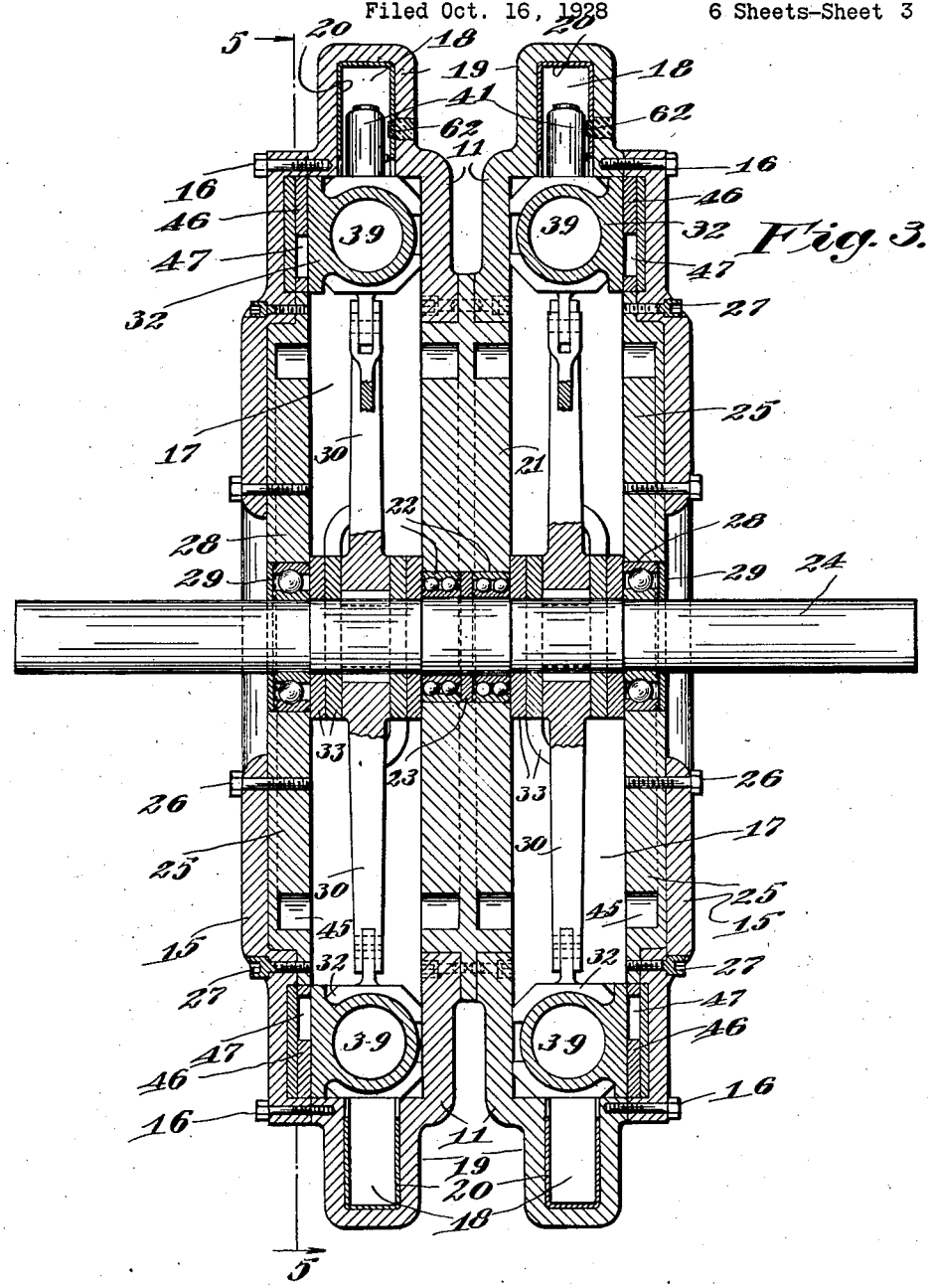
Fig. 3 is a central sectional elevation taken on the line 3—3 of Fig. 6.
Figure 5:
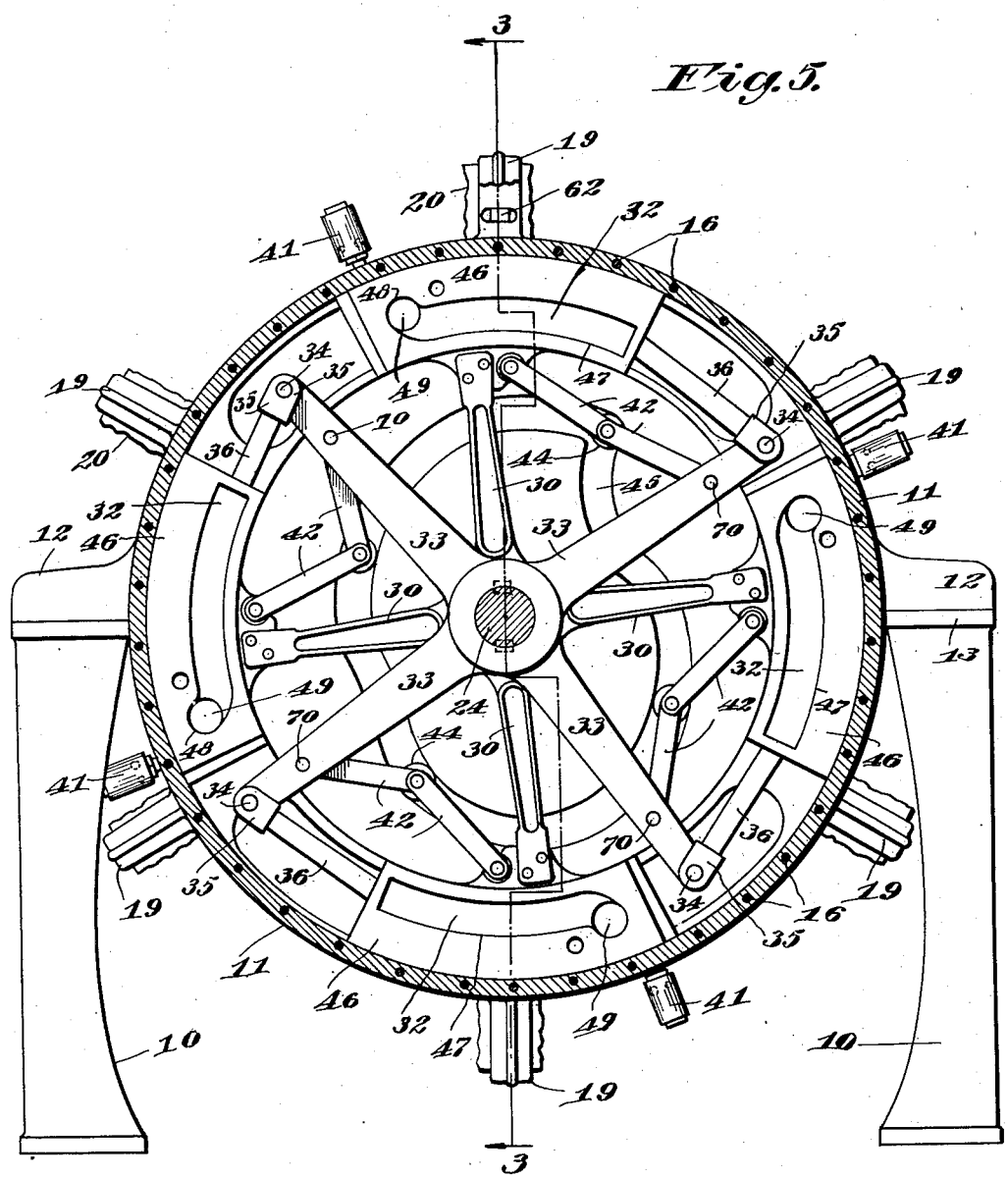
Fig. 5 is a central sectional elevation taken on the line 5—5 of Fig. 3.

Referring more particularly to Figs. 2, and 5, it will be seen that with reference to Fig. 3 that I have provided a centrally located four armed spider 30, the central hub of which is securely held to the drive shaft 24 by means of keys 31a adapted to fit in corresponding key-ways therefor provided in such drive shaft 24, and spider hub 30. Located on the outer ends of the spider arms 31 are the cylinders 32, the outside walls of which are substantially of rectangular outline. Located on either side of the spider hub 30 and rotatably mounted on the drive shaft 24 are two piston crank levers 33 having suitable off-sets at predetermined places thereon for clearance purposes, the outer ends of which are fitted with pins 34, the outer ends of which are enclosed by the forked end 35 of the connecting rods 36, the opposite end of which is journaled around the wrist-pins 37 located in pistons 38. The internal bore of the cylinders 32 is round in cross section as indicated in Fig. 3 by the numeral 39, and likewise the pistons 38 have a similar shape as is common in all internal combustion engines, but it will be noted that the side walls of such bore 39, and pistons 38 are curved corresponding to the curvature of the chamber 17 located within the casings 11. Suitable compression rings 40 are provided on the outer walls of such pistons 38 and are adapted to engage with the internal bore 39 of the cylinders 32. Special spark-plugs 41, the operation of which will be described later, are located in the outer wall of the cylinders 32 adjacent the closed end thereof and in that portion of the cylinder corresponding to the compression chamber in the older type of internal combustion chamber. Connecting cylinders 32, and piston crank levers 33, are link members 42 connected to each other by means of pins 43, the outer ends of which are adapted to carry cam roll members 44 located within the internal cam track 45 provided in the side wall members 28, and 25, for the purpose of providing for the various operations of the cylinders and pistons, the description of which will be further referred to in the operation of the engine.

Figure 6:
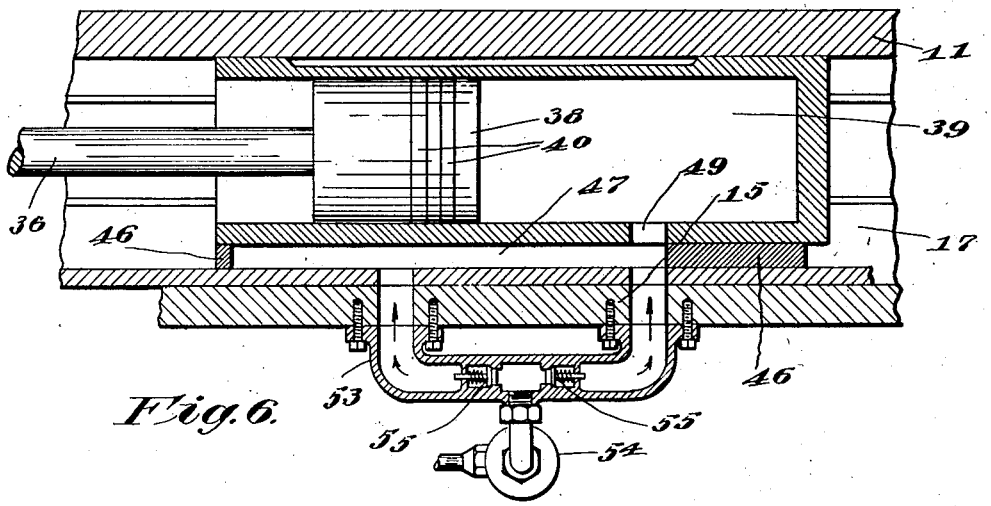
Fig. 6 is a fragmentary section shown on an enlarged scale and taken on the line 6—6 of Fig. 4.

Attached to the cylinders proper, and adjacent the sides abutting the end plates 15, of the engine units, is plate member 46 having an elongated open slot 47 extending from the open end of the cylinder wall to a point opposite the compression chamber in the head of such cylinder and terminating in a circular end 48 in alignment with a corresponding opening 49 directly connecting with said compression chamber in said cylinder head. This slot 47 with connecting opening 49 provides means for the exhaust after the firing stroke through the exhaust port 50 located in the end plates 15. A carburetor 54 is centrally located on the manifold 53 and a spring value 55 is located to the right and left of the carburetor connection such that a long gas intake period may be obtained as the gas starts sucking from the carburetor through the left hand side of valve 55 as soon as the port 49 contacts and midway of the intake stroke both ends of the manifold are in operation as shown in Fig. 6, and the right hand manifold port continues to be in contact with slot 47 after the rear end of said slot is past the left hand port of said manifold. The spring valves 55 automatically close as the suction from the cylinder head is cut off by the slot 47 in the plate 46.

It is also apparent that any number of engine units within practicability can be used in cylinder multiples of four thereby giving great flexibility to the motor because of the fact that every cylinder fires once on every revolution of the drive shaft which is not the case in the common type of internal combustion engines.

Figure 7:
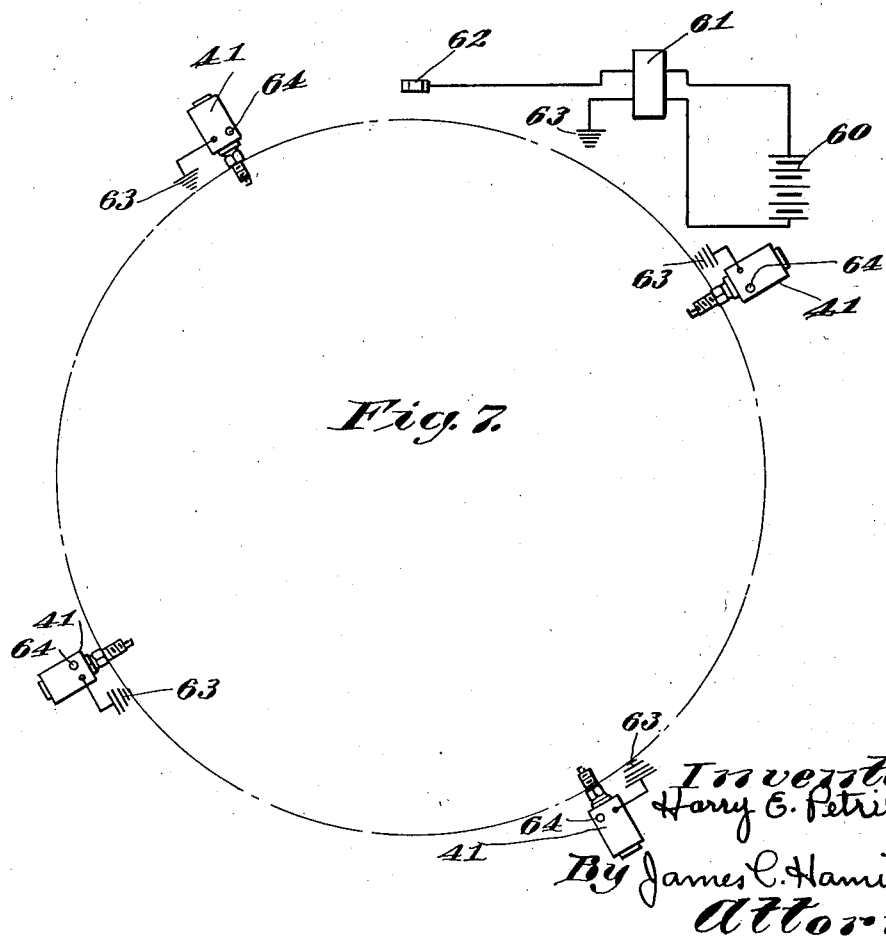
Fig. 7 is diagram of the ignition system.

In an internal combustion engine such as above described, any suitable ignition means may be utilized, but for purposes of illustration, I have shown in Fig. 7 a simple electrical power supply consisting of a battery 60 connected with a spark coil 61 one side of which may be grounded on the engine and the other which may be an insulated contact point located on the inner chamber or side wall of the casing 11 and indicated at 62. The special oil and waterproof spark-plug 41 may be provided with one of the firing points grounded to the engine casting in the usual manner as shown at 63 while the other point 64 is adapted to engage at the proper time with the contact 62 thereby creating an internal explosion in the head of the cylinder by means of the spark thereby produced.

In operation, in my improved internal combustion engine above described, it is to be assumed that the engine has been constructed and arranged as above described and that the parts are properly proportioned and timed with respect to each other. Fig. 2 indicates a position corresponding to the end of a firing operation in the topmost cylinder. Reading the drawings in a counter clock-wise direction, cylinder number two which has just fired is travelling forward and at this point is drawing the piston up in the cylinder bore by means of the links 42, and cam rolls 44 cooperating to that end in the stationary cam track 45. This is the exhaust stroke cooperating with the exhaust port 50, and 51, previously described; cylinder number three preceding number two in a similar manner, that is, by means of links 42, and cam rolls 44, cooperating together with cam track 45, is intaking gas through the manifold 55 as the piston 38 is drawn backward in the cylinder bore 39; cylinder number four is compressing by means of the links, cam rolls, and cam track aforesaid, and by the time that the cam roll reaches the firing point F indicated on the cam track 45, will be in a position fully compressed and ready to fire. At this point, the spark-plug 41 located in the head of cylinder 4 is making contact with the electrical contact point 62 in the casing 11, and at that time the link 42 located on piston crank lever 33 of the cylinder 4 is about to swing about the pin 70 located on said piston crank lever 33, in a circle concentric with said pin 70 due to the fact that at that time that corresponding portion of the cam track 45 is concentric with such pin 70. Under such circumstances the piston is brought to rest, is locked against backward motion while the cylinder is allowed to travel forward as the explosion occurs due to the electric circuit through the points 62, and 64. The cylinder 32 straightens out the links 42, and at the end of the stroke indicated in cylinder number one, again picks up the piston 38 and starts the exhaust operation previously described.

It should be borne in mind that the engine unit on the other side corresponding to the one shown in Fig. 2 is similar in all details except the position of the cam track 45 in side wall members 21, and 25, and is firing in its corresponding cylinders at a position approximately 45 degrees between the cylinders shown in Fig. 2, and because of such arrangement the crank shaft 24 has imparted to it a power impulse corresponding to every 45 degrees of its revolution, or eight explosions per revolution thereby developing great power at low speed which has never been successfully accomplished to the best of my knowledge, up to the present time, in a reciprocating internal combustion engine.

It will further be apparent that due to my design, the cylinders and pistons are continually fanning themselves in the air which is allowed to circulate around them on practically all sides and ends. Suitable oiling provisions may be arranged for in several different ways which is of no practical account in this application and therefore not illustrated in detail.

While I have necessarily shown and described the preferred embodiment of my invention somewhat in detail, it is to be understood that I may vary the size, shape, and general arrangement of parts within wide limits without departing from the spirit of the invention.

Having thus described my invention, what I claim as new is:

In an internal combustion engine, a drive shaft, a cylinder mounted on said shaft to form a circular path concentric with the axis of said shaft to drive the same, a piston adapted to reciprocate in said cylinder, toggle links connecting said piston to said cylinder, a toggle pin connecting said toggle links having an end projecting laterally therefrom, a cam groove immovably mounted adjacent said cylinder circle to receive the toggle pin end, said cam groove, at that portion thereof where the toggle pin is positioned when the cylinder is firing, being substantially concentric with the path of movement of the outer end of that toggle link which is connected to the piston, for retaining the piston in substantially a stationary position during the firing period.

HARRY E. PETRILLI.